(12) United States Patent
Sturm

(10) Patent No.: US 7,442,899 B2
(45) Date of Patent: Oct. 28, 2008

(54) CLAMPING DEVICE

(75) Inventor: Thomas Sturm, Wiedenzhausen (DE)

(73) Assignee: KUKA Systems GmbH, Augsburg (DE)

( * ) Notice: Subject to any disclaimer, the term of this patent is extended or adjusted under 35 U.S.C. 154(b) by 385 days.

(21) Appl. No.: 10/533,263

(22) PCT Filed: Jul. 14, 2004

(86) PCT No.: PCT/EP2004/007754

§ 371 (c)(1),
(2), (4) Date: May 10, 2005

(87) PCT Pub. No.: WO2005/016591

PCT Pub. Date: Feb. 24, 2005

(65) Prior Publication Data

US 2006/0053932 A1    Mar. 16, 2006

(30) Foreign Application Priority Data

Aug. 7, 2003    (DE) .............. 203 12 401 U

(51) Int. Cl.
*B23K 37/04* (2006.01)

(52) U.S. Cl. ........................ 219/161; 228/49.1

(58) Field of Classification Search ................ 219/158, 219/161; 228/49.1
See application file for complete search history.

(56) References Cited

U.S. PATENT DOCUMENTS

| | | | | |
|---|---|---|---|---|
| 4,893,398 A | * | 1/1990 | Zimmer | ................ 483/14 |
| 5,267,683 A | * | 12/1993 | Hamada et al. | ............. 228/4.1 |
| 6,378,186 B1 | | 4/2002 | Angel | ................ 29/281.1 |
| 6,457,574 B1 | | 10/2002 | Semmlinger et al. | ... 198/341.05 |

FOREIGN PATENT DOCUMENTS

| | | |
|---|---|---|
| DE | 38 28 267 A1 | 3/1989 |
| DE | 696 08 431 T2 | 12/2000 |
| DE | 201 03 412 U1 * | 4/2002 |
| DE | 201 03 412 U1 | 5/2002 |
| EP | 0 760 770 B1 | 4/1998 |
| EP | 1 277 540 A2 | 1/2003 |
| GB | 2208820 A | 4/1989 |
| WO | WO 95 32886 | 12/1995 |

* cited by examiner

*Primary Examiner*—Kevin P Kerns
(74) *Attorney, Agent, or Firm*—McGlew & Tuttle, P.C.

(57) ABSTRACT

A clamping device or system (1) is provided for body parts (8, 9), which have a component clamping contour (11), especially a component flange. The clamping device or system (1) has one or more clamping devices (2, 3), which have each a frame-like structure (12) with fixed and mobile clamping units (18, 19) arranged therein, which are present in a plurality of pairs. The clamping units (18, 19) have a strip-shaped design and are adapted to the course of the component clamping contour. Furthermore, the clamping device or system (1) has an adjusting device (21), which feeds the mobile clamping units (19) to the component clamping contour and actuates them together or in a controllable sequence.

23 Claims, 14 Drawing Sheets

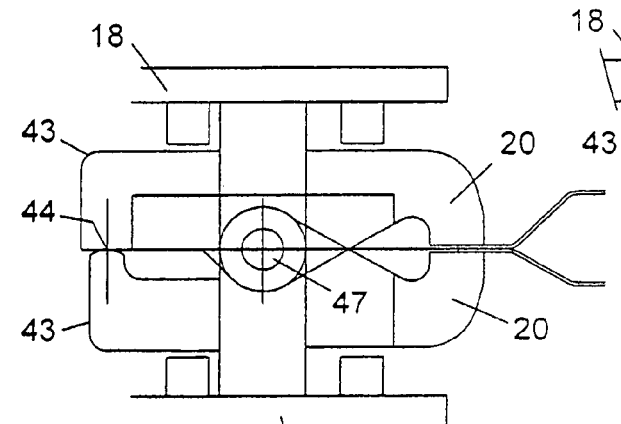
Fig. 8
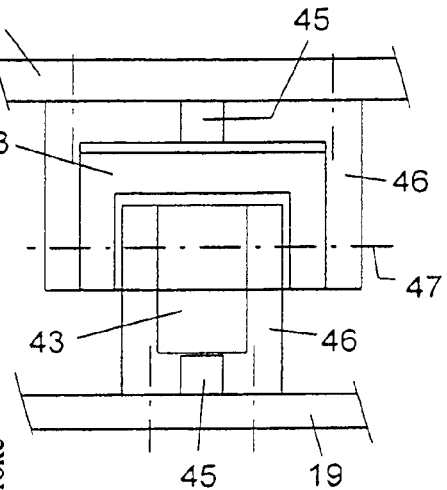
Fig. 9
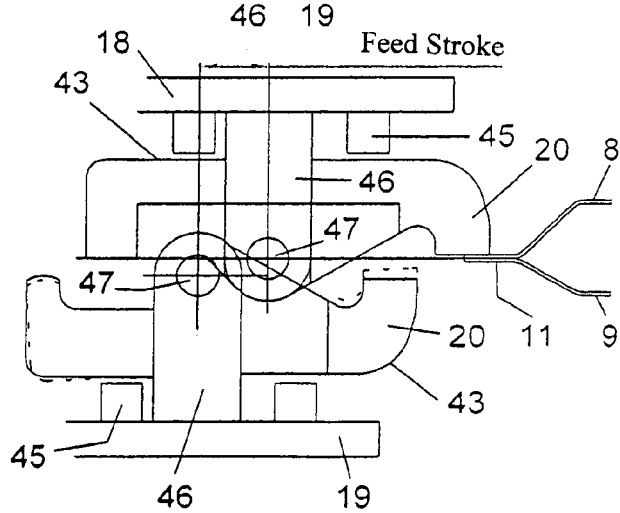
Fig. 7
Fig. 6

CLAMPING DEVICE

CROSS REFERENCE TO RELATED APPLICATIONS

This application is a United States National Phase application of International Application PCT/EP2004/007754 of Jul. 14, 2004 and claims the benefit of priority under 35 U.S.C. § 119 of German Application DE 203 12 401.4 filed Aug. 6, 2002, the entire contents of which are incorporated herein by reference.

FIELD OF THE INVENTION

The present invention pertains to a clamping device or system for components, especially body parts.

BACKGROUND OF THE INVENTION

It is known and common in the practice of manufacturing vehicle body shells to clamp the body parts by means of clamping frames in so-called framing stations or even in downstream welding stations. These clamping frames comprise a massive frame, on which a plurality of individual clamping units are arranged at the needed locations. A plurality of components can be clamped together with these individual clamping units, and a component flange that is needed for the welded connection and another component clamping contour are formed now. Such a clamping frame in conjunction with a conventional feed device is known, e.g., from DE 38 28 267 A1. Furthermore, it is known from EP 0 760 770 B1 that such clamping frames can also be handled by means of robots and can be fed to the vehicle body.

Stationary clamping device or system, which comprise a plurality of individual clamping units, into which the components are inserted, are used in the construction of jigs and fixtures. Such a clamping means is known, for example, from DE 201 03 412 U1.

The use of individual clamping units in the prior-art clamping means has various drawbacks. Due to their size, the individual clamping units can be arranged at greater distances only, which leads to problems for some clamping tasks. On the other hand, deformations of the components may occur because the individual clamping units are usually closed offset in time and due to the punctiform clamping action. Finally, the clamping units must be opened and then closed one after another during seam welding by means of a laser beam in order to make possible the circulation of the laser beam without obstacles. This may likewise lead locally to clamping problems because of the great distances between the clamping units, especially when the flange of the component is opened and undesired or excessively large gaps are formed as a result between the components. Special problems arise during the clamping of component flanges at openings in the body, e.g., door or window openings. The individual clamping units often fail to satisfactorily accomplish the clamping tasks for the above-mentioned reasons. In addition, they hinder access for machining devices, e.g., welding robots, etc., due to their large space requirement. On the whole, the clamping means equipped with individual clamping units inherently have the drawbacks of having a large space requirement and a heavy weight, requiring great efforts for assembly and adjustment and a correspondingly high price.

SUMMARY OF THE INVENTION

The object of the present invention is to provide an improved clamping technique.

The clamping device or system being claimed has the advantage that it leads to better clamping results, has a smaller space requirement and can be designed, in particular, as a very flat clamping device or system. Moreover, the clamping device or system has considerably more free space for machining devices. Special advantages arise when entire cutouts or contours are to be clamped all at once on components, which happens, e.g., in case of body openings, connection sites between body parts, e.g., the side wall and the roof part or the like.

The clamping devices being claimed make it possible to create any desired geometry with a minimum space requirement with the clamping segments. Due to the flat design, it is possible now to keep the clamping units closed during the machining of the flange, e.g., during laser seam welding and to create and maintain defined clamping and process conditions as a result. Furthermore, it is possible to actuate the clamping units together in a controllable sequence and to feed them preferably simultaneously in the process and to bring them into a clamped connection. As a result, exactly defined clamping conditions can be created, and undesired deformations of the components are avoided.

Special advantages arise when internal flanges at openings of components, especially door or window openings of body components, are to be clamped. The component flange can be clamped circumferentially with a simple clamping device, it can be fed to the component opening thanks to the preferred feed and clamping kinematics of the clamping device with retracted movable clamping units. The retracted clamping units can now be moved past the flange of the component and then fed to the rear side of the flange and brought into the clamped position. As an alternative, clamping of one or more component flanges located on the outside is possible.

The clamping devices can be fed in any desired manner and they can also be fixed in their clamped position. Due to corresponding suitable supports, it is possible now to create both an external network reference and a component reference. Component tolerances that may be present are absorbed in the external network reference and deformed components are forced, if necessary, into the correct desired position during clamping. However, the supporting takes place in relation to external positioning means. When a component reference is formed, the clamping device is oriented according to the existing geometry of the components, and the supporting is in relation to suitable reference points on the components. Component tolerances can be tolerated to a greater extent in this case.

The clamping devices can be arranged on conventional clamping frames instead of the individual clamping units and moved by these clamping frames relative to the vehicle body. A modular clamping frame design is possible now by means of standardized feed modules. As an alternative, the clamping devices may also be fed in any other desired manner, e.g., by means of conveying robots. For example, lifting devices or conveyors with a holder for a plurality of clamping devices, which said holder has feed and movement axes of its own, are suitable for internal or external feed. The clamping devices are suitable, furthermore, for manual feed, which is possible, e.g., by means of a movable suspension on a balancer. In case of manual feed or feed by means of conveying robots, a stationary guide for docking or fixed points may be present at the component for the exact positioning of the clamping devices. The clamping devices may, furthermore, be self-supporting in the clamped position and supported at the component, which is possible, e.g., in case of the welding of previously tacked components and in case of sufficient stability of the clamping contour of other support points on the component.

The clamping devices have an adjusting device, with which the movable clamping units are fed in the desired manner and brought to the fixed clamping units in the clamped connection. A very great variety of possible design embodiments are available for the adjusting device. In the preferred embodiment with cam shafts, it is possible to move all movable clamping units movably and in a defined manner by means of a single drive motor, in which case movement along two axes is possible during feeding and clamping. As an alternative, a manual clamping drive with a ratchet or the like may be used. In addition, the feed device, especially a robot, may be used as a clamping drive.

The component flanges may be clamped in any desired clamped position. A deliberate gap formation is also possible now, as it is useful, for example, for welding coated sheets for releasing gases from the coating. The clamping device may, furthermore, also be used to deform the component flanges, in addition to clamping them, in which case, e.g., beads are embossed to form local gaps between the component flanges. This embossing operation may be carried out separately prior to the clamping and optionally also on the individual component.

The present invention is schematically represented in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention is illustrated.

BRIEF DESCRIPTION OF THE DRAWINGS

In the drawings:

FIG. 6 is a view showing a variant of the clamping units in one of different movement positions;

FIG. 7 is a view showing a variant of the clamping units in another of different movement positions;

FIG. 8 is a view showing a variant of the clamping units in another of different movement positions;

FIG. 9 is a view showing a variant of the clamping units in another of different movement positions;

DESCRIPTION OF THE PREFERRED EMBODIMENTS

Figure 1:
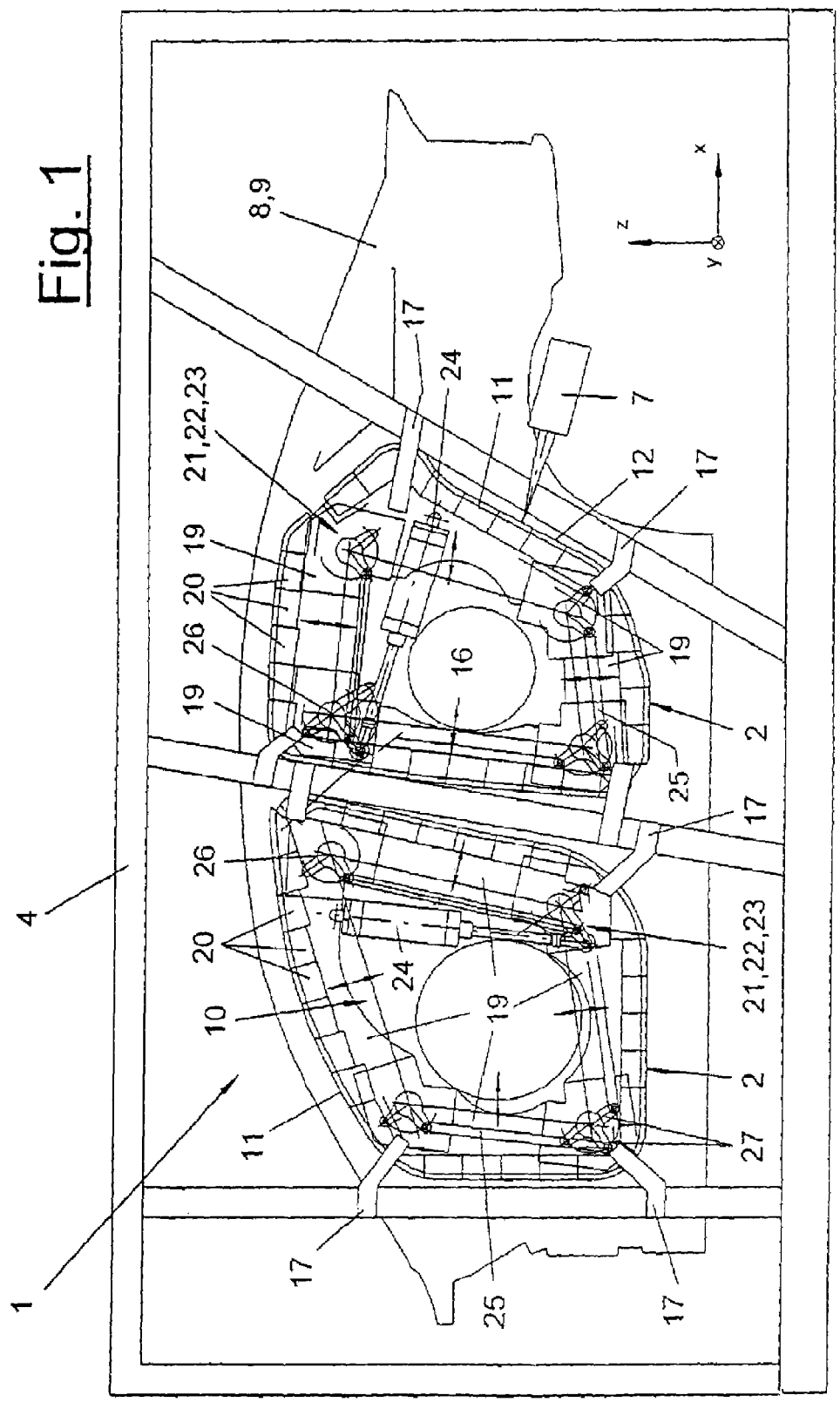
FIG. 1 is a clamping device or system with two clamping devices at a vehicle body.

Referring to the drawings in particular, the present invention pertains to a clamping device or system 1, which comprises at least one or more clamping devices 2, 3, which will hereinafter be described in detail. Furthermore, one or more feed devices, which are designed as a clamping frame 4 in one variant and as a robot 5 in the other variant in the exemplary embodiments being shown, belong to the clamping device or system 1. The present invention pertains, in addition, to a machining station 6, especially a framing station or geo station, with such a clamping device or system 1 and additional components, not shown, e.g., machining devices, especially welding robots, tool magazines, component conveyors and the like.

The clamping device or system 1 is used to clamp components 8, 9. These are preferably body parts. However, the components 8, 9 may otherwise be any other desired workpieces. The components 8, 9 clamped together may be machined or treated in any desired manner. They are usually joined together or connected to one another, which is carried out by means of a suitable machining tool 7, e.g., the laser welding head shown schematically in FIG. 1. The components 8, 9 to be connected, which are components of a vehicle side wall in the exemplary embodiment according to FIG. 1, have bent edges, which lie one on top of another and form at least one flange of the component. The components 8, 9 are clamped by the clamping device or system 1 on this component flange 11, which also forms the clamping contour of the component at the same time, in their connected position. In the exemplary embodiment according to FIG. 1, the components 8, 9 have two component openings 10, which represent the front and rear door openings of the side wall. An internal component flange 11, which extends circumferentially over the entire contour of the opening, is present at these component openings 10.

These circumferential component flanges 11 are clamped with the clamping devices 2 described in greater detail below over a varying part of their length. In the variant according to FIG. 1, the clamped length is the entire component flange 11 extending circumferentially over the component opening. In the variant according to FIG. 17, the clamped length is shorter, and, e.g., only two component flanges 11 on both sides are clamped at the B pillar 53. The clamping devices 2 are positioned now at and at least partially in the component openings 10. In the internal area or on the side, the clamping devices 2, 3 leave open a free space 16, through which machining devices, e.g., multiaxial welding robots, can pass and machine the rear side of the body side wall, which is invisible in the drawings in FIGS. 1 and 17, with their machining tools.

The clamping devices 2 have a network reference in the embodiment shown in FIG. 1. They are now fastened via a plurality of suitable supports 17, e.g., mounting flanges, on struts of a surrounding clamping frame 4. The clamping frame 4 is brought in the machining station into a predetermined position in space in a suitable manner and held in that position. The clamping frame 4 can be positioned for this purpose stationarily at a frame or even at a pallet-like support of the components 8, 9 and pegged out. The clamping frame 4 forms a feed device, with which both clamping devices 2 can be fed to the components 8, 9. The feed motion may also be kinematically reversed. Due to the clamping function of the clamping devices 2, the components 8, 9 are clamped in a position predetermined in the absolute system of space coordinates and somewhat defined in the process, if necessary, in case of deviations in dimensions and shape.

Figure 11:
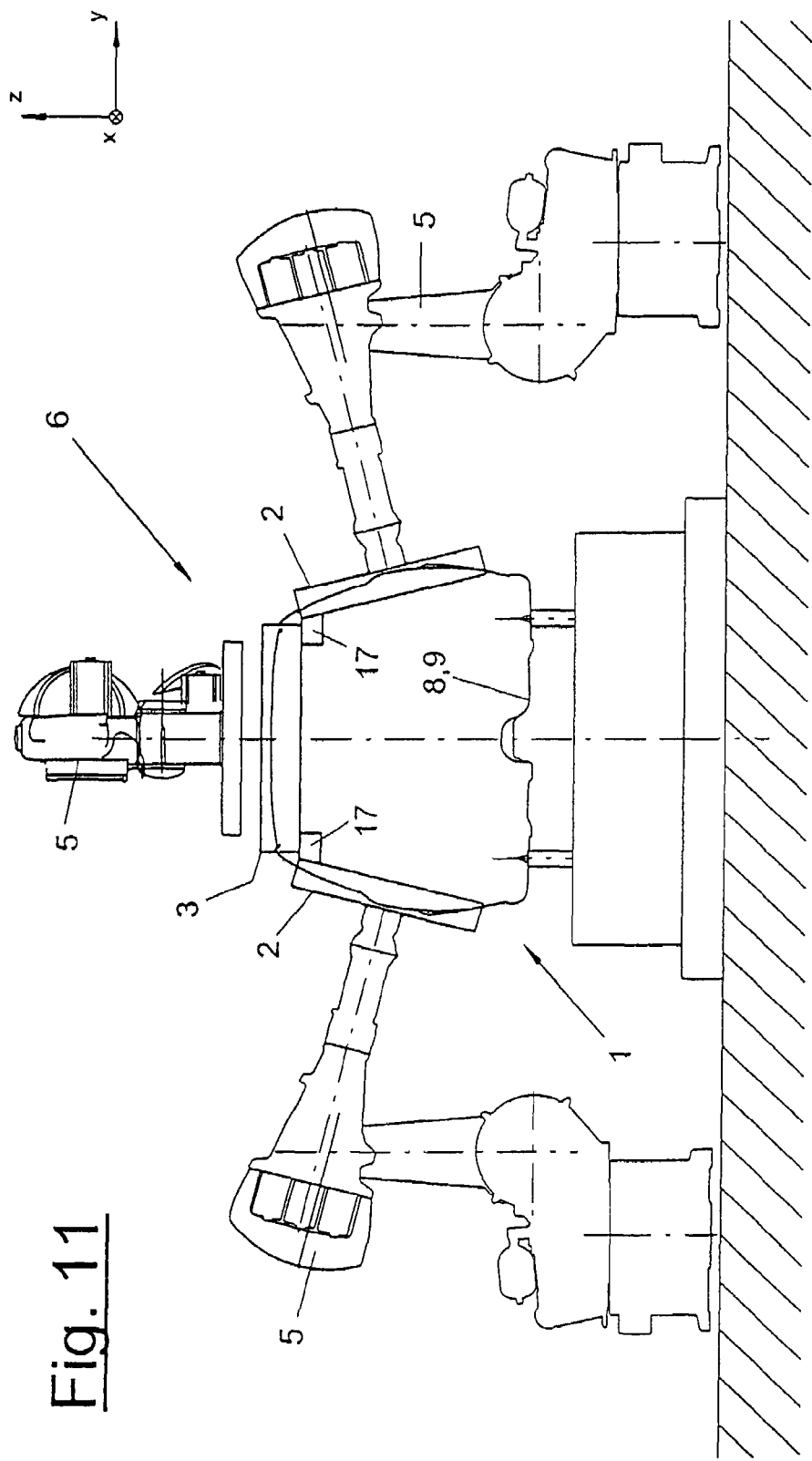
FIG. 11 is a front view of a machining station with a clamping device or system with a plurality of conveying robots and clamping devices.

FIG. 11 illustrates a machining station 6, at which the clamping devices 2 are fed by means of robots 5 to the side parts of the body 8, 9, which is already loosely pretacked. The robots 5 are two articulated arm robots arranged in a floor-bound manner on both sides of the transfer line and the component conveyor with six or more axes. The clamping devices 2 are detachably and replaceably connected with the robot hands via suitable devices and optionally also via change-over couplings.

In addition, another clamping device 3, which clamps parts of the roof construction and optionally parts of the side walls of the body, is present in the roof area of the body 8, 9 in the variant shown in FIG. 11. The clamping device 3 may likewise be fed by means of a robot 5, e.g., a portal robot. The three clamping devices 2, 3 are supported in this embodiment at one another via corresponding support elements 17 and are connected and interlocked with one another by suitable built-in positioning devices. The clamping devices 2, 3 form a stable clamping housing as a result. The positioning may be carried out in an external network reference or even in an internal body reference. The clamping devices 2, 3 are positioned here via suitable supports not shown in relation to body reference points, e.g., certain body openings. The clamping devices 2, 3 can be held by the robots 5 in the position shown. In case of corresponding supports at the body 8, 9, they may also be self-supporting.

It is possible in a variant of the exemplary embodiments to load the clamping devices 2, 3 with components 8, 9 to clamp them at the same time and to bring them into the correct position for joining by means of suitable feed devices 4, 5 only thereafter. This may happen, e.g., in a geo station or framing station, which corresponds, in principle, to the embodiment shown in FIG. 11. As an alternative, the machining station 6 may also be of any other desired type and be used, e.g., as a welding station for the finishing welding of the body pretacked in the framing station.

The clamping devices 2, 3 for the side and roof area may have, in principle, the same design. Therefore, reference will be made below jointly to the exemplary embodiment of the lateral clamping devices 2 according to FIGS. 1 through 10 for explanation.

The clamping devices 2 shown in FIG. 1 comprise a frame-like structure 12 each, in which a plurality of fixed and mobile clamping units 18, 19 are arranged, whose position and orientation are adapted to the course of the component clamping contour 11 and the component flange. The clamping units 18, 19 have the shape of flat strips, which are provided at the external edge with a plurality of clamping segments 20 arranged next to one another. These clamping segments 20 at the fixed and mobile clamping units 18, 19 come into contact with the component flange 11 in the clamped position and have the desired shape and are adapted correspondingly for this. A variable shape of the flange over the height, here in the Y axis, can also be assumed due to a corresponding shaping of the clamping segments 20. The clamping strips 18, 19 are preferably designed as flat plates, and changes in height may likewise be present, as an alternative, in the middle area for adaptation to bulges of the component flange 11. The clamping strips 18, 19 preferably have the narrowest shape possible, which follows the course of the flange on the outside and may be straight or concave on the inside to enlarge the free space 16.

The fixed and mobile clamping units 18, 19 are preferably present in associated pairs, four such pairs being arranged one after another in a closed ring corresponding to the contour of the opening in the component in FIG. 1. The clamping devices 2 have, moreover, an adjusting device 21, which feeds and clamps the mobile clamping units 19 at the component flange 11.

Figure 2:
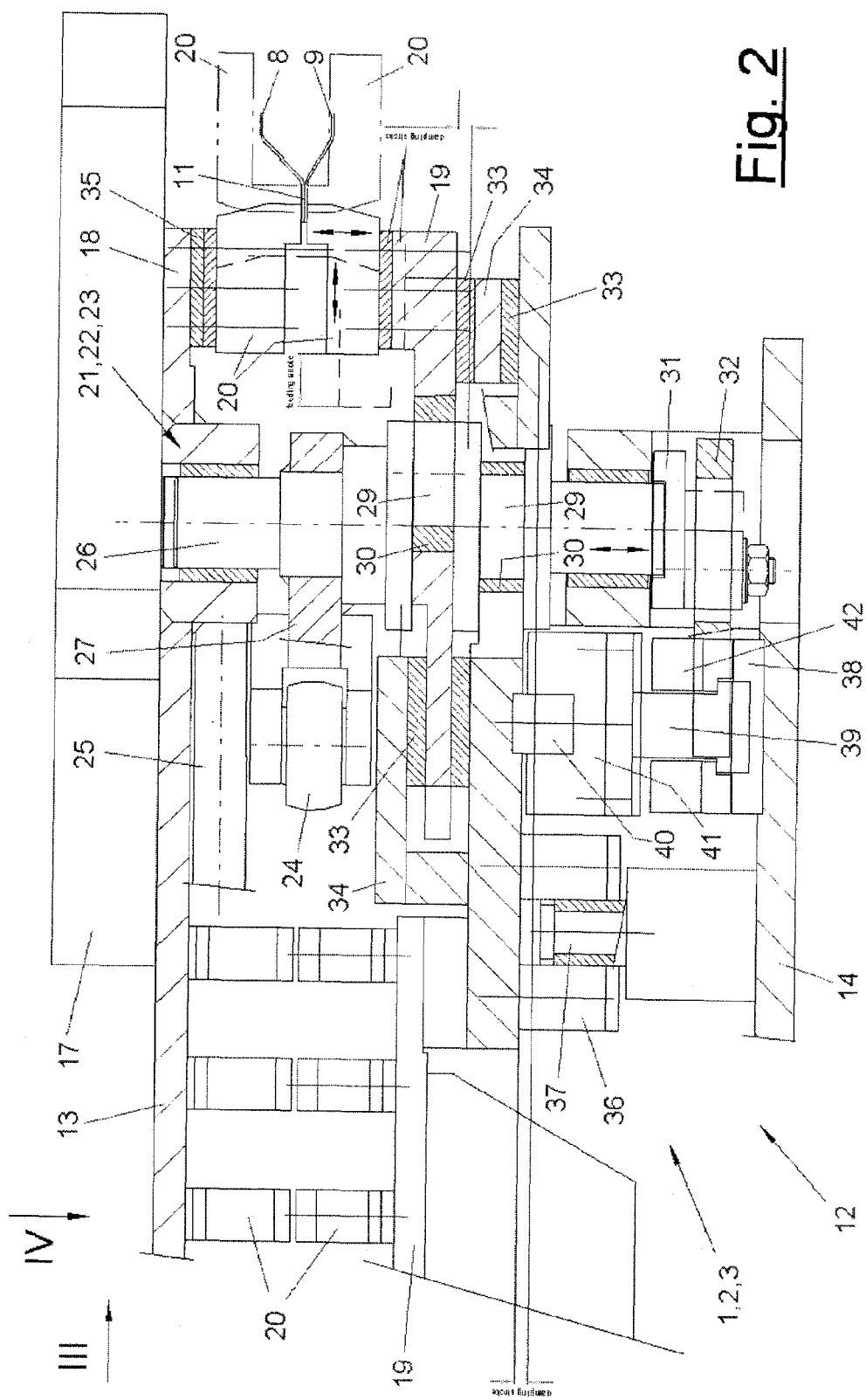
FIG. 2 is a cut-away and enlarged cross section through a clamping device in the corner area.
Figure 3:
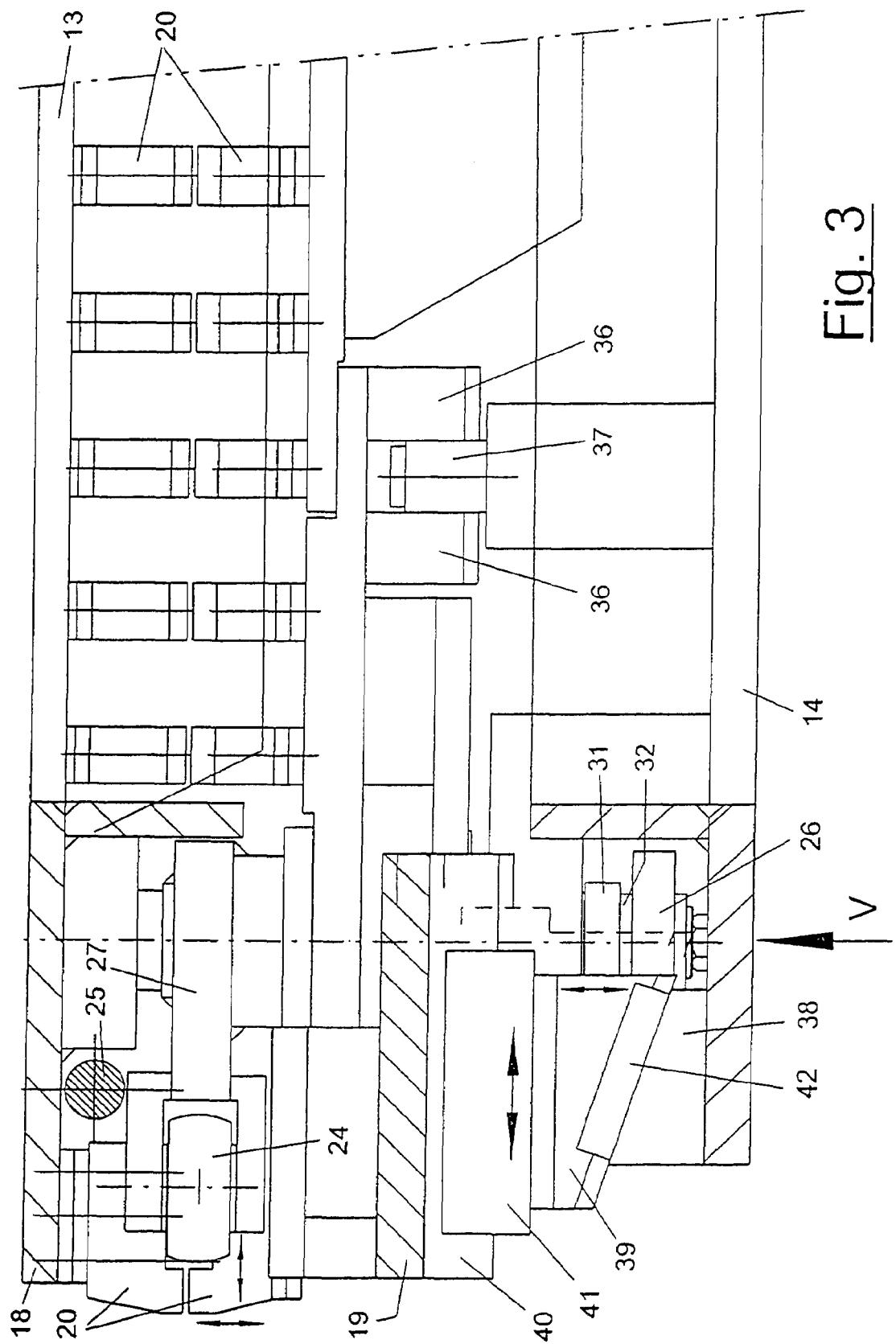
FIG. 3 is a tilted side view of the arrangement according to FIG. 2 along arrow III.
Figure 4:
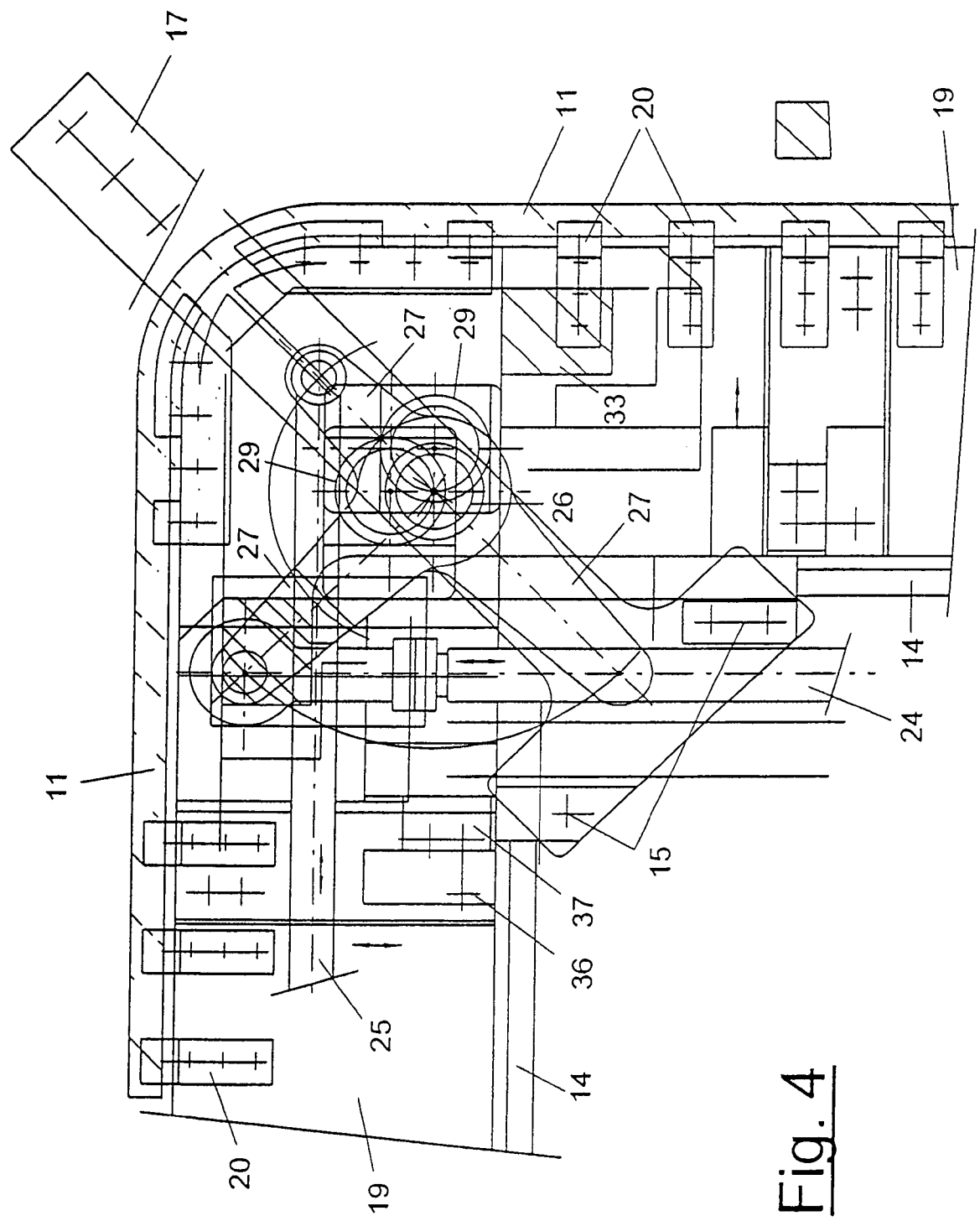
FIG. 4 is a top view of the arrangement according to FIG. 2 along arrow IV.

As is illustrated in a cross section in FIGS. 2 and 3, the frame 12 likewise has an annular design and comprises a bottom part 13 and a cover part 14, which are arranged at spaced locations from one another and preferably in parallel to one another. They are kept at spaced locations from one another by struts or other, preferably thin connection parts 15 arranged outside the clamping units 18, 19 (cf FIG. 4 and are rigidly connected to one another. A kind of sandwich housing is thus formed, which accommodates the clamping units 18, 19 and at least parts of the adjusting device 21 in the internal distance or in the free space.

The clamping strips 18, which are a rigid part of the frame, are associated with the bottom part 13 in the embodiment being shown and are fastened to same. As an alternative, they may also be integrated within the bottom part 13. The mobile clamping strips 19 are supported at the cover part 14 and are guided in a suitable manner there. The frame 12 is oriented in relation to the components 8, 9 in FIG. 1 such that the bottom part 13 is located in the rear in the direction of feed. The cover part 14 located in the front is moved through the component opening 10 during the feed. As is illustrated in FIG. 2, the external contour of the cover part 14 stands back for this purpose in relation to the circumferential component flange 11. Likewise, the mobile clamping strips 19 can also be retracted inwardly to the extent that they are outside the overlap with the component flange 11 with their clamping segments 20 in the rearward inoperative position and can pass through the flange.

Figure 5:
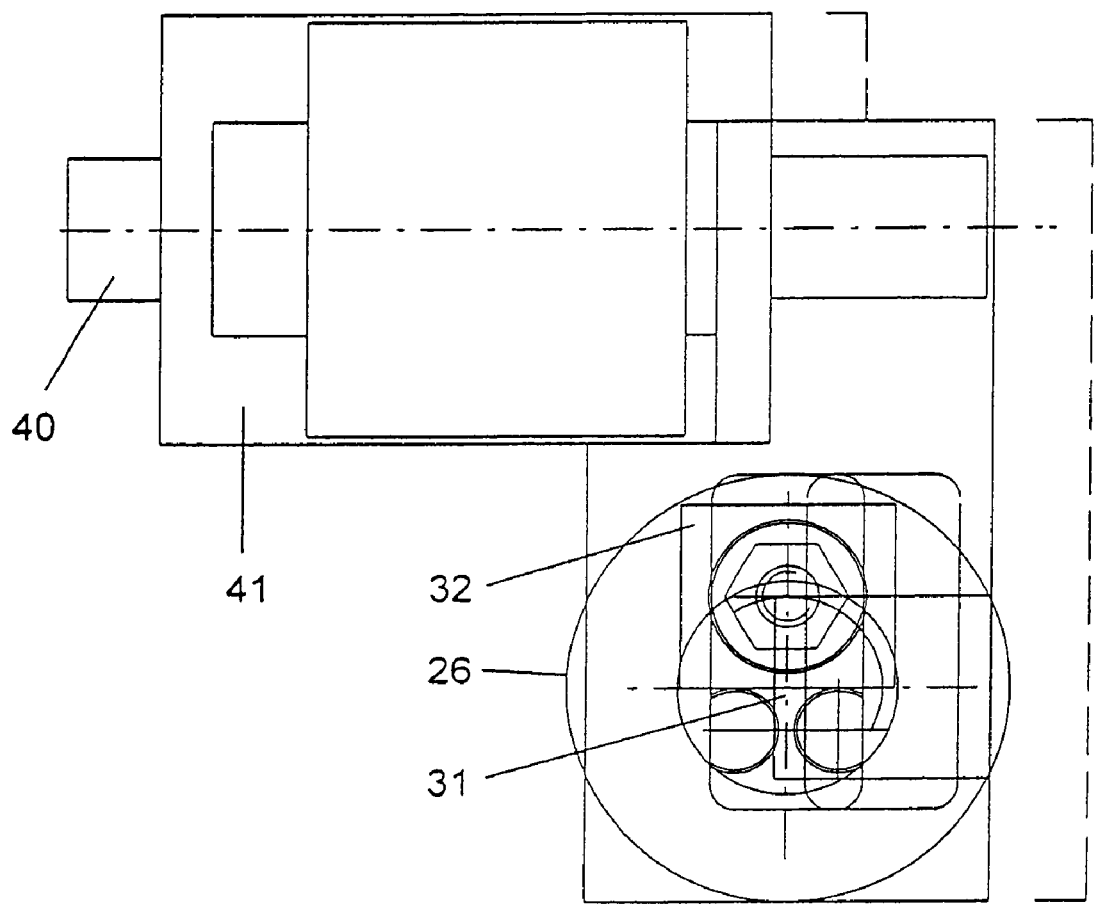
FIG. 5 is a cut-away bottom view of the clamping device along arrow IV in FIG. 3.
Figure 10:
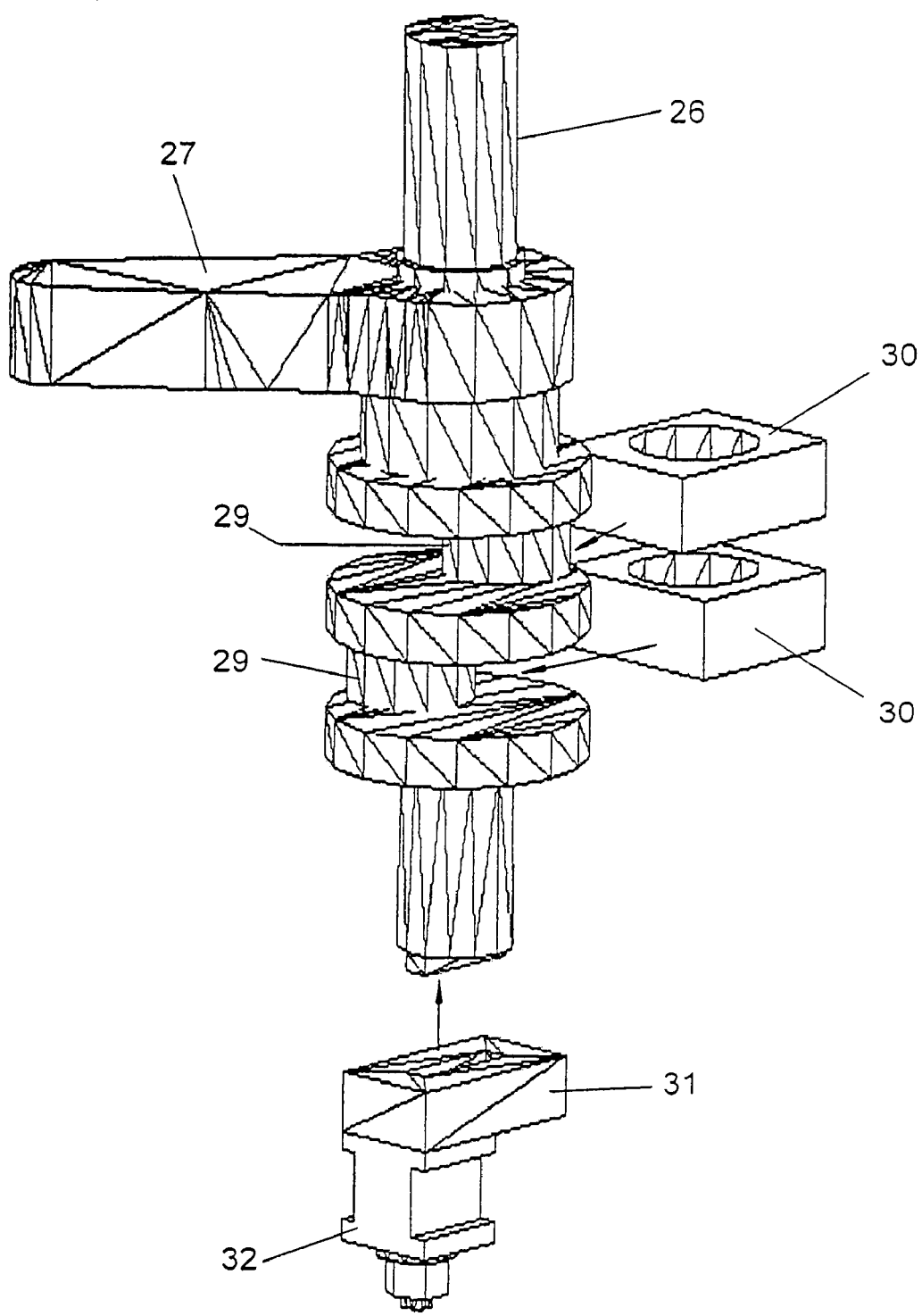
FIG. 10 is a perspective view of a cam shaft with feed and clamping cam along with sliding blocks.

During the feed of the clamping devices 2, the frame 12 with the clamping strips 18, which are rigid parts of the frame, and with the clamping segments 20 thereof are positioned in a contact position and clamped position on the outside at the component flange 11. This is preferably also the welded or joined side. The mobile clamping strips 19 are then moved outwardly from the rearward inoperative position and are brought into the clamped position on the internal side at the component flange 11. This is brought about in the embodiment being shown by two translatory movements directed essentially at right angles to one another, namely, a feed motion extending essentially along the extension of the flange and a clamping movement extending transversely, the so-called clamping stroke. The feed and clamping strokes are shown in FIGS. 2, 3 and 5. In addition, the inoperative positions of the mobile clamping strips 19 and of the clamping segments 20 are indicated by broken lines.

The adjusting device 21 moves the mobile clamping units 19 correspondingly. All mobile clamping units 19 in the clamping device 2 are preferably actuated together and simultaneously. As a result, the clamped connection is established simultaneously circumferentially in the entire area in which pressure is applied to the component flange 11. As an alternative, the clamping units 19 may also be actuated one after another in a controllable sequence.

The adjusting device 21 has one or more corresponding, suitable drives for actuating the clamping unit 19. In the embodiment being shown, it has a combined pushing and clamping drive 22, 23 for the feed and clamping strokes taking place one after another as well as the simultaneous admission of pressure to all mobile clamping strips 19. The adjusting device 21 has an individual drive motor 24 and a power divider 25 for this. The drive motor 24 may have any desired suitable design. It is a hydraulic or pneumatic cylinder in the exemplary embodiment being shown.

The mobile clamping units 19 arranged in the closed ring overlap one another at the points of impact in the contact or corner area with an offset in height and are mounted in a mutually displaceable manner, and they are also supported against each other and mutually guide each other via sliding plates 33 and cover plates 34 in a positive-locking manner. FIG. 2 illustrates this arrangement in a cross section. The respective clamping bars 19 located at the bottom are, moreover, guided in their direction of feed via strip-shaped guides 36 and sliding elements 37 located therein at the cover part 14.

To make it possible to transmit the drive movements to the mobile clamping strips 19, a total of four parallel cam shafts 26, which are mounted rotatably on a frame 12 and extend at right angles to the principal plane of the frame, are arranged at the corner areas and contact areas or points of impact of the mobile strips 19. The cam shafts 26 have preferably multi-armed actuating levers 27, which project transversely from the cam shaft 26 and are connected with the power divider 25, which is preferably designed as a crank mechanism. A cam shaft 26 is also connected with the connection of the piston rod of the cylinder 24 in an articulated manner. The cylinder 24 is mounted at the frame 12 in an articulated manner at the rearward end. The cam shafts 26 are rotated by the crank mechanism 25 simultaneously and by the same angle. Each mobile clamping strip 19 is fed at both ends by a cam shaft 26 each and brought into the clamped position.

The cam shaft 26 has two laterally bent feed cams 29, which are arranged one on top of another and apply pressure to the two mobile clamping strips 19 connected diagonally and are adjusted in height and angle in relation to one another for this purpose corresponding to the association of the strips. In addition, the cam shaft 26 has a clamping cam 31, whose actuation raises the connected clamping strip 19, while it carries the other, diagonally adjacent clamping strip 19 due to the positive-locking guiding. The feed and clamping cams 29, 31 are preferably arranged such that the feed motions take place simultaneously and as a first movement, and that the clamping stroke takes place in the end area of the feed motion. Relatively short feed strokes and clamping strokes of, e.g., 5 mm, which are smaller than in the conventional individual clamping units, are necessary in the design shown in the exemplary embodiments.

The feed cams 29 are surrounded by sliding blocks 30, which are guided in corresponding openings at the clamping strips 19, to which pressure is applied, and convert the rotary movement of the cam into a translatory feed motion. To make it possible to perform the clamping stroke, there is a vertical mobility and a corresponding difference in height or thickness between the clamping strips 19 and their sliding blocks 30 or, as an alternative, between sliding blocks 30 and the feed cams 29.

The feed cam 31 arranged at the lower end of the cam shaft 26 likewise cooperates with a sliding block 32, which converts the rotary movement into a translatory displacing movement and actuates a clamping wedge arrangement 38, 39 in the process and generates the clamping stroke. A second clamping wedge 39 with oblique contact plane, which said clamping wedge is acted on by the sliding block 32 and is pushed obliquely upward along the wedge surface, is mounted movably on a clamping wedge 38, which is a rigid part of the frame. The cohesion of the clamping wedges 38, 39 is ensured by bilateral overlapping strips 42. The sliding movement of the mobile clamping wedge 39 is transmitted to a guide carriage 41, which is guided in such a way that it performs a translatory movement along a guide rail 40 on the underside of the clamping strip 19 to which pressure is applied. Due to a corresponding positive-locking connection between the sliding blocks 30, 32 and the corresponding openings, the clamping and feed strokes take place in the reversed direction and order during the reverse rotation of the cam shaft 26.

As is illustrated in FIG. 2, the clamping segments 20 are preferably designed as bent contour blocks, whose clamping surfaces are adapted in position and orientation to the course of the flange. The accurate height adjustment of the clamping segments 20 in relation to their clamping strips 18, 19 can be brought about by means of adjusting elements 35, e.g., ground shims. Because of the different height positions of adjacent mobile clamping strips 19 in the corner and contact area, additional height compensation measures are provided in order to ensure a continuous clamping contour.

The clamping segments 20 may be arranged in a closely spaced series-connected arrangement along the component flange 11 and have the outwardly directed claw geometry indicated by solid lines in FIG. 2. A component-side edge area of the flange 11 may remain free now, at which, e.g., a laser seam welding can be performed with a pressing roller. The clamping segments 20 form the contour projecting farthest outwardly at the clamping device 2. In conjunction with the flat design of the frame, sufficient space is present for a laser welding head as a result. In addition, there is no shadowing during the remote laser welding with laser heads arranged at spaced locations, with which the laser beam migrates per scanner means or by a conveying movement of the laser head. Continuous laser weld seams are now possible without opening the clamping device or system 1.

FIG. 2 shows a variant of the clamping segments 20 by broken lines, and their arrangement is inverted, so that they leave free the front edge of the component flange 11. In another variant, not shown, the clamping segments 20 may have a contoured front side and have, e.g., recesses in order to make it possible to prepare laser-welded line seams in this free area in the clamped position. In addition, the clamping segments 20 may also be arranged at any desired laterally spaced locations from one another. Their design and arrangement depends basically on the shape of the flange and the requirements of the process and they may vary correspondingly as desired.

FIGS. 6 through 9 show another variant of the arrangement and shape of the clamping segments 20. These are arranged here on essentially U-shaped clamping arms 43, which are mounted freely rotatably via projecting supports 46 at the fixed and mobile clamping units 18, 19 by means of a swivel bearing 47. Bilateral stop bolts act as a position limitation means 45 for the rotary movement of the clamping arms 43.

The clamping arms 43 form so-called piano tensioners, wherein the front ends of the arm form the clamping segment and are in contact with the component flange 11 in the clamped position when the swivel bearings 47 are flush with their axes. The rotation position is stabilized by the rearward arm ends, which likewise abut against one another and form a brace or counterstop 44. The active surfaces of the arm ends are now in a common plane each with the axes of rotation of the swivel bearing 47 and with the center of the flange.

As FIG. 9 shows as a angled side view of FIG. 8, the clamping arms 43 and the supports 46 overlap each other and have corresponding openings and projections for this. In this embodiment, the clamping segments 20 are located next to one another at the fixed and mobile clamping strips 18, 19 laterally in the longitudinal direction of the flange. This is also possible, in principle, in the above-described arrangement according to FIGS. 2 through 5.

In the variant according to FIGS. 6 through 9, FIG. 6 shows the starting position of the clamping arms 43 before the beginning of the feed stroke. The mobile clamping strip 19 now assumes the above-described retracted inoperative position. The rotary adjustments of the pivoted arms 43, which are allowed via the position limitation means 45, are indicated by broken lines. FIG. 7 shows the subsequent position after the completion of the feed stroke of the mobile clamping strip 19. The drag bearings 47 and the pivoted arms 43 are now located flush one under the other in the direction of the clamping stroke, and the clamping stroke of the mobile clamping strips 19 into the end position according to FIGS. 8 and 9 takes place from this position.

In a variant of the embodiments shown, the pivoted arms 43 can respond correspondingly and likewise assume an oblique position in case of bent or obliquely standing component flanges 11.

Various variants of the embodiments shown and described are possible.

On the one hand, the clamping devices 2, 3 may remain at the components 8, 9 after the end of the first machining process and moved with these into the next machining station.

In another variant, the mobile clamping strips 19 and/or their clamping segments 20 can be fed by a pivoting movement and brought into the clamped position. In addition, any other desired feed and clamping movements are possible.

Furthermore, it is possible to accommodate auxiliary means, e.g., protective gas or exhaust means, in the clamping units 18, 19 and optionally also at the clamping segments 20. These may be integrated within the clamping segments 20 or, as an alternative, be arranged on the outside at these clamping segments 20. For example, protective gas lines may be installed on the outside at the clamping segments 20 and detachably fastened by means of suitable clip connections or the like. The protective gas lines may have openings in the jacket, nozzles or the like for the desired discharge of gas in the needed areas.

Furthermore, the clamping devices 2, 3 may be parts of the joining and machining technique by containing, e.g., electromagnetic inductors for heating by means of high-frequency alternating fields, where sealants, adhesives or the like can be cured. Such a connection technique may be used instead of the hitherto common welding technique for the adhesive connection of the components 8, 9. The clamping devices 2, 3 can now be clamped and bonded in one operation. Longer residence of the clamping devices 2, 3 in the clamped position at the components 8, 9 and carrying during the further conveying is advantageous in this case.

In another variant, cooling means, which ensure, for example, a targeted cooling of the component and removal of heat, e.g., during welding, may be arranged at the clamping devices 2, 3.

In addition, the clamping segments 20 may have a height contour that deforms the component flange 11 and with which, e.g., embossed areas are formed on the component flange 11 in order to form free spaces for the release of gases from coated sheets during welding.

In the embodiment being shown, the clamping devices 2, 3 clamp a component flange 11 located on the inside at component openings 10. This association may also be reversed, in which case the components 8, 9 have, as in the example according to FIG. 17 described in greater detail below, at least one outside component flange 11, which may extend essentially straight and/or extend, at least in some areas, diagonally or over an arc area. The shape of the clamping devices 2, 3 is correspondingly adapted in this case, and the clamping devices form, e.g., an outside arc-shaped collar or ring, which surrounds the components 8, 9 at least in some areas, the clamping segments 20 being arranged on the internal side. The clamping device 2, 3 may also be arc-shaped at component openings 10 and extend only over a partial area of the opening circumference. The shape of the clamping devices 2, 3 may be adapted, in principle, to any course and contour of components 8, 9 and component clamping contours 11. The component clamping contours may have any desired and suitable design and do not have to be in the above-described flange form.

Further variants are possible concerning the design of the individual parts of the clamping devices 2, 3. This applies both to the shape and the design of the frame 12 and the fixed and mobile clamping units 18, 19 and the adjusting device 21. The latter may have, e.g., separate drive units for the feed stroke and the clamping stroke. The clamping stroke may, furthermore, be brought about with a different kinematics, e.g., by means of a coarse thread on the cam shaft with a corresponding crank.

FIGS. 12 through 16 show variants of the feed device 4, 5 for one or more clamping devices 2.

Figure 12:
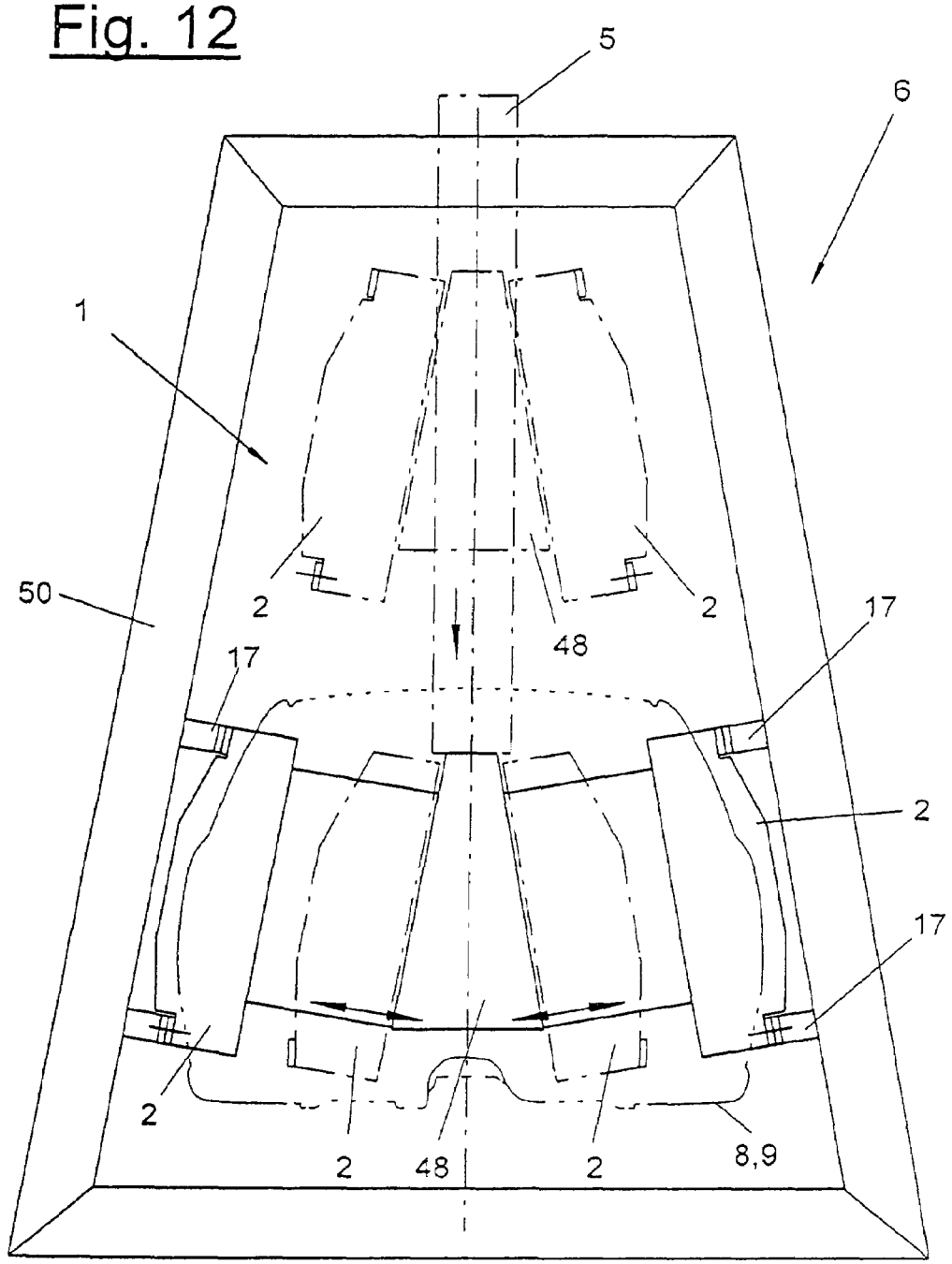
FIG. 12 is a variant of the machining station according to FIG. 11 with another feed device for internal feed from the top.

FIG. 12 shows a front view of a machining station 6 with a feed device 5, which is provided for the internal feed of one or more clamping devices 2, which are fed, e.g., to two side walls 8, 9 through a roof opening from the top and from the internal side. The feed device 5 is designed in this variant as a lifting device with a stamp and a holder 48 for one or more clamping devices 2. The lifting device 5 may have, in addition, auxiliary axes, e.g., a longitudinal mobility. It is mounted in the machining station 6 in a suitable manner, e.g., at a station frame 50. The holder 48 has one or more auxiliary axes, with which it can move the clamping devices 2 taken up laterally and feed them to the side walls 8, 9.

Figure 13:
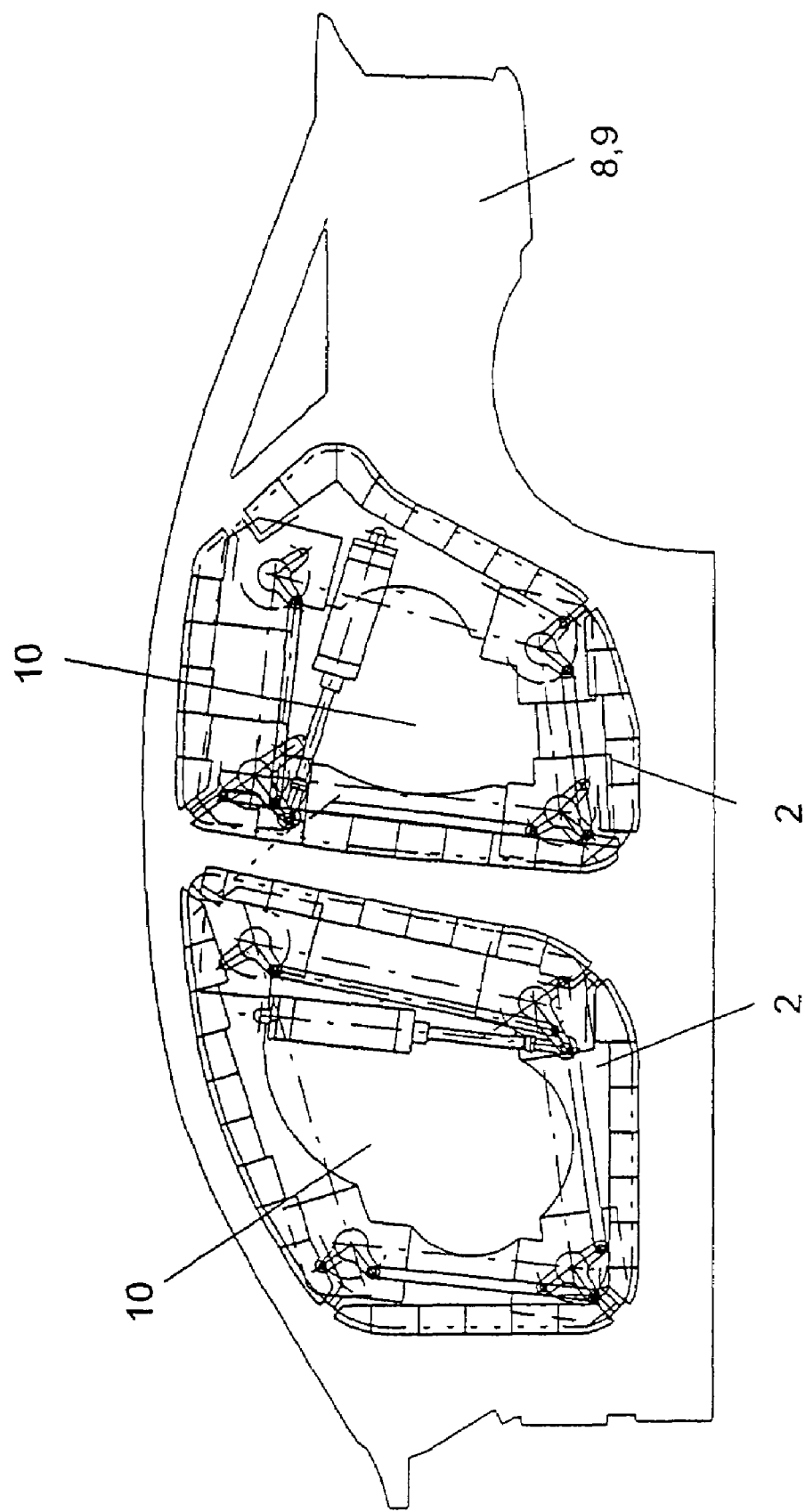
FIG. 13 is a side view of a vehicle side wall with two clamping devices fed from the inside in the door cutouts.

In the raised starting position, the holder 48 is withdrawn, so that it can pass through the roof opening or the free space between two individually held side walls 8, 9 with its two or four, bilaterally suspended clamping devices 2. Once having reached the interior space of the body, the holder 48 moves out laterally or spreads, feeding the clamping devices 2 being held to the side walls 8, 9. The clamping devices 2 may now be fixed at the station frame 50 on the outside in the operating position by clamping, holding or the like. FIG. 13 shows the corresponding position of the clamping devices 2 in the two door cutouts 10 of a side wall 8, 9 during the internal feed. The cover part 14 is not shown here.

Figure 15:
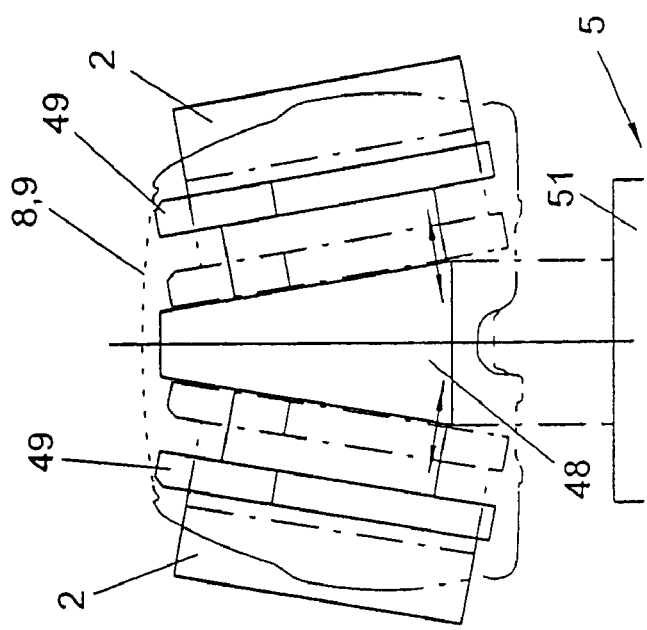
FIG. 15 is a front view of a variant of FIG. 12 with a front-side internal feed of clamping devices.
Figure 14:
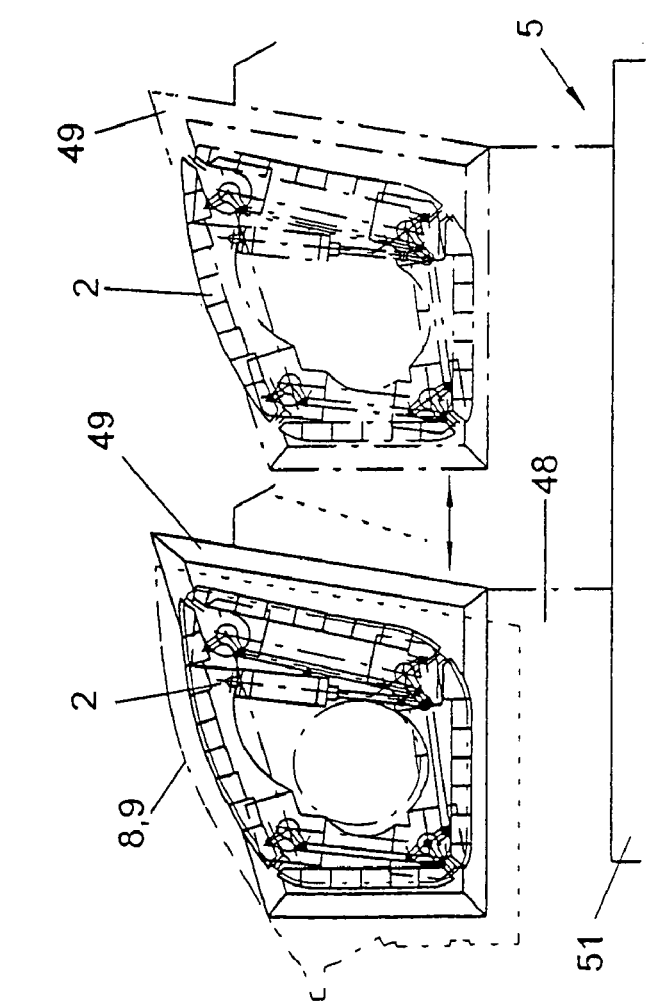
FIG. 14 is a side view of a variant of FIG. 12 with a front-side internal feed of clamping devices.

Internal feed of two or more clamping devices 2 to two side walls 8, 9 of a vehicle body, which said side walls are located at spaced locations, likewise takes place in the variant according to FIGS. 14 and 15. The direction of feed is this time axial in the direction of the X axis of the machining station. The feed device 5 may be in this case a suitable conveyor 51, e.g., a carriage or the like, on which a suitable holder 48 is in turn arranged for one or more clamping devices 2. Due to the lateral mobility and the auxiliary axes of the holder 48, the clamping devices 2, which have first entered with a narrow contour, can then be spread out to the outside and fed.

FIGS. 14 and 15 also show that the clamping devices 2 may themselves be arranged at intermediate supports and especially at standardized feed modules 49. This offers a possibility of standardization for the holder 48, in which case only the feed modules 49 are adapted to the particular geometry of the clamping device and can be replaced together with the clamping devices 2.

Figure 16:
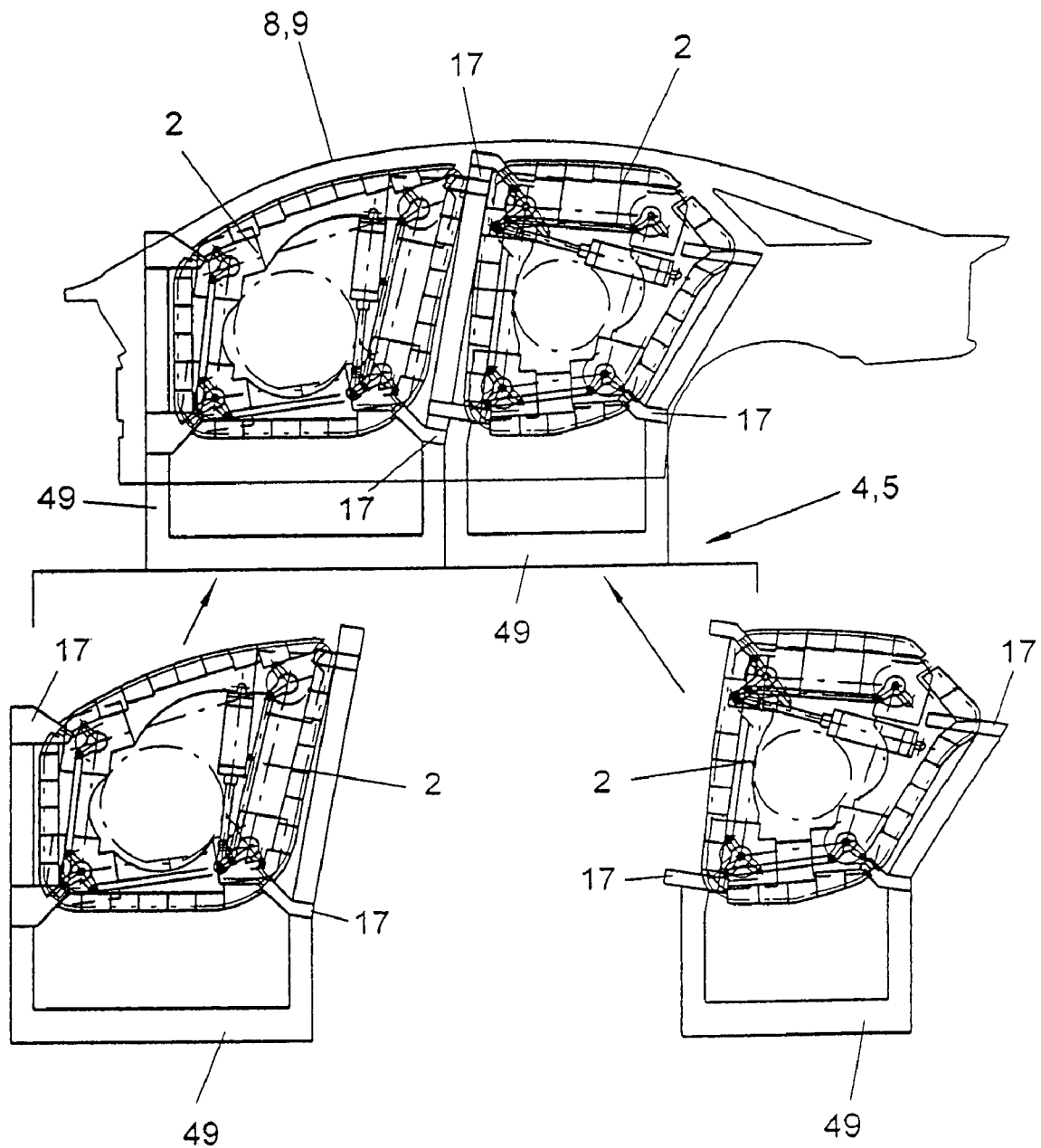
FIG. 16 is a modular design of a feed device for clamping devices.

In the variant according to FIG. 16, the feed device 4 may be a clamping frame, which has a modular design on the basis of the above-mentioned feed modules 49. The feed modules 49 can be rigidly or detachably connected with one another herefor by suitable fixing means or supports 17. In particular, automatic change-over units may also be used here. The clamping devices 2 are in turn connected with the feed modules or clamping frame modules 49 via suitable supports 17.

Figure 17:
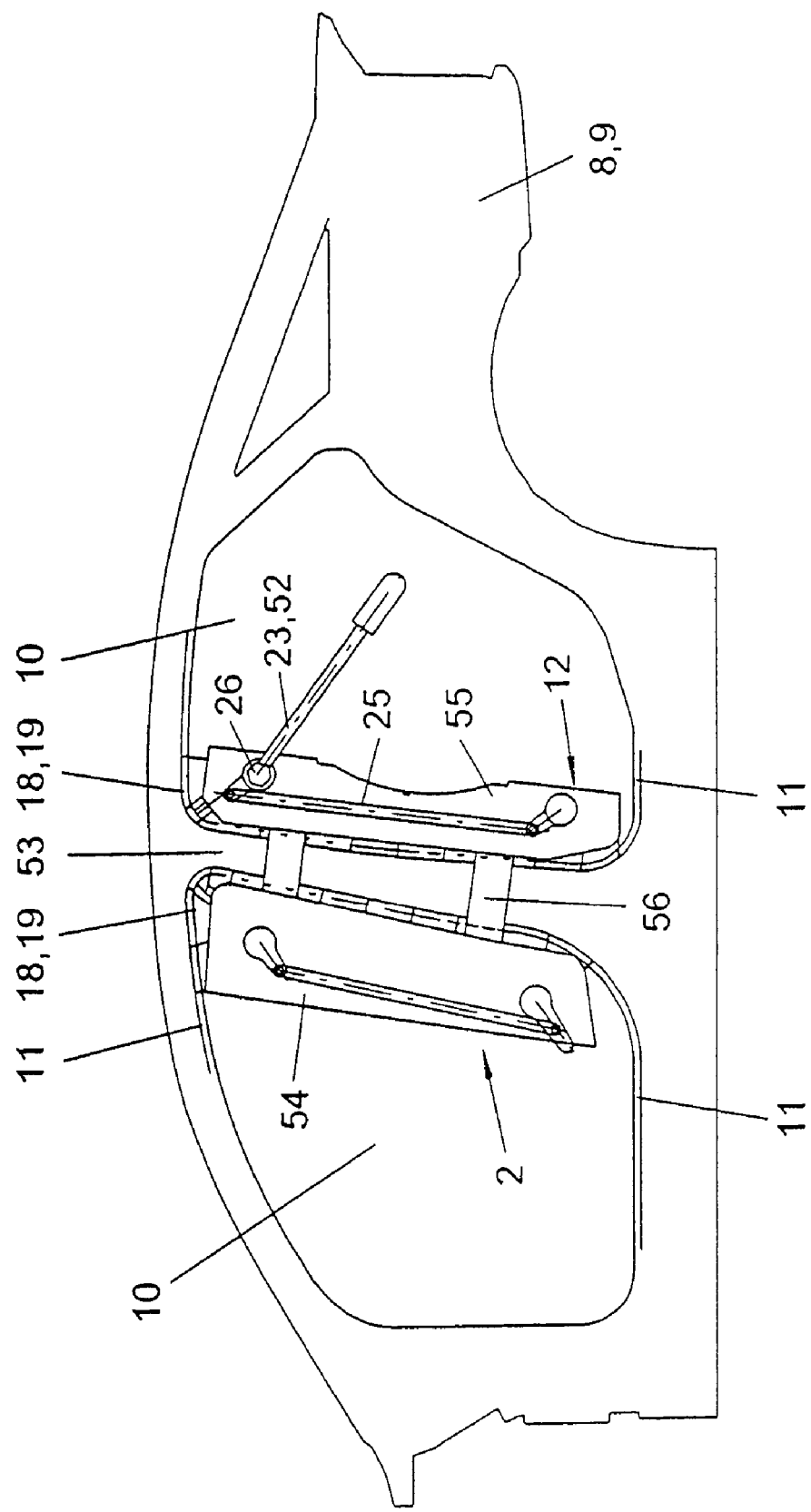
FIG. 17 is a view showing a variant of the clamping device with external feed.

FIG. 17 illustrates the above-mentioned variant of the external clamping of component flanges 11. For example, the left-hand and right-hand component flanges 11 of the central B pillar 53 of the side wall 8, 9 of the body are clamped here. The clamping contour may optionally also extend partially into the adjoining roof and rocker panel area. The clamping device 2 has a multipart, frame-like structure 12 herefor, which has two spaced-apart, strip-shaped frame parts 54, 55 for a component flange 11 each and one or more connecting frame parts 56, e.g., connecting straps. Each of the frame parts 54, 55 has two clamping units 18, 19 in the above-described embodiment with fixed and mobile clamping strips and with a plurality of clamping segments 20.

FIG. 17 illustrates further variants of the above-described embodiments. On the one hand, this applies to the feed and the holding of the clamping device 2. This [clamping device] may be fed, for example, manually by a worker and positioned at the component 7, 8. For example, the clamping device 2 may hang laterally movably on a bracket, a so-called balancer not shown in a laterally movable manner and balanced with a counterweight. The worker pushes the clamping device 2 with the mobile clamping units 19 retracted to the component 8, 9, e.g., the B pillar 53 shown in FIG. 17, and then actuates the clamping drive 23. The positioning of the clamping device 2 may be carried out, e.g., by means of slides or other positioning means at the connection straps 56, which engage corresponding positioning openings or other fixed points (not shown) on the B pillar 53. The clamping device 2 locks itself in the clamped position at the component flanges 11 and is supported at the component 8, 9. The supporting may be ensured via the clamping contour or optionally also via the positioning means.

FIG. 17 also illustrates a variant of the design of the clamping drive 23. The latter may comprise. e.g., a manual drive 52, especially the ratchet shown. This [ratchet] may be arranged, e.g., on a cam shaft 26, in which case there is a positive-locking rotary connection by means of a detachable hexagon or the like. The rotating driving movement can be transmitted via a power divider 25 to the second cam shaft 26 and optionally to additional cam shafts.

In a variant of the exemplary embodiment according to FIGS. 1 through 5, which was described at the beginning, the clamping drive 23 may be taken over in a variant, not shown, by the feed device 5, especially a robot, while the cylinder 24 is eliminated. After the feed of the clamping device 2, 3 and the fixation of the clamping device, the robot 5 equipped with a change-over coupling becomes detached from the clamping device 2 and actuates one or more cam shafts 26 with a suitable rotary tool. The rotary tool can be grasped by the robot 5 from a magazine or, as an alternative, it may be located at the robot hand.

Figure 18:
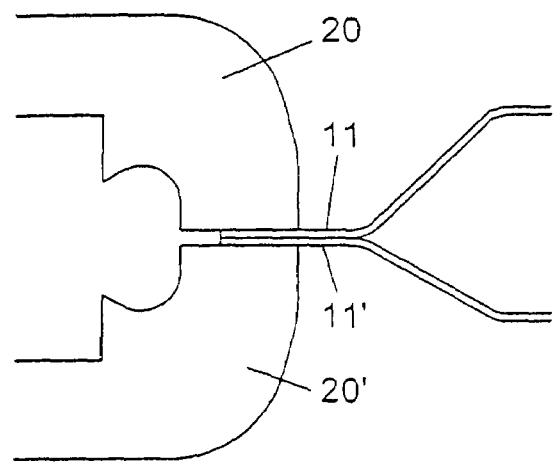
FIG. 18 is view showing a clamping situation with component flanges lying one on top of another.
Figure 19:
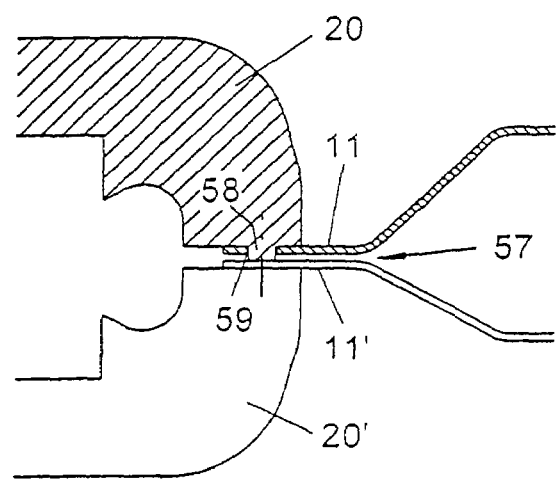
FIG. 19 is a view showing a variant of the clamping situation with a gap between the component flanges.
Figure 20:
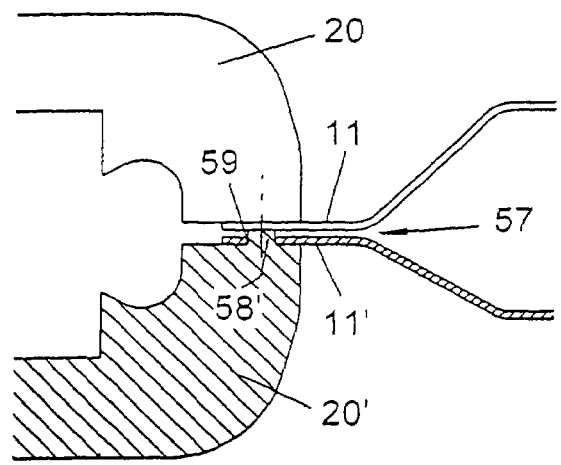
FIG. 20 is another view showing the variant of the clamping situation with a gap between the component flanges.

FIGS. 18 through 20 show various clamping situations for component edges or flanges 11, 11'. In the variant according to FIG. 18, the component flanges 11, 11' lie flat on one another and are clamped in the contact position. This corresponds, e.g., to the embodiment shown in FIGS. 6 through 9.

In the variant according to FIGS. 19 and 20, it is possible to form a gap 57 between the component flanges 11, 11' in the clamped position. Alternately projecting pins 58, 58', which extend through corresponding flange openings 59 of the respective associated and adjacent component flange 11, 11', are arranged for this, e.g., at the clamping segments 20, 20'. In FIG. 19, the pin 58 arranged at the upper, shaded clamping segment 20 presses the lower component flange 11' located opposite and presses same against the contact surface of the lower clamping segment 20'. FIG. 20 shows the clamping situation at another point of the clamping contour, where the upwardly extending pin 58' at the lower, shaded clamping segment 20' presses the component flange 11 located opposite against the contact surface of the upper clamping segment 20. The length of the pins 58, 58' is greater than the thickness of the component flange 11, 11' passed through, so that the gap 57 of the desired size is formed due to the oversize of the pin. Both component flanges 11, 11' can be clamped firmly and securely by a plurality of pins 58, 58' directed in opposite directions and arranged alternately along the clamping contour and brought to the desired gap size.

While specific embodiments of the invention have been shown and described in detail to illustrate the application of the principles of the invention, it will be understood that the invention may be embodied otherwise without departing from such principles.

The invention claimed is:

1. A clamping device for body part components with a component clamping contour including a component flange, the clamping device comprising:

a clamping device having a frame structure with a plurality of pairs of fixed and mobile, strip-shaped clamping units, each clamping unit being adjacent to another clamping unit, each clamping unit being independently movable, said clamping device being mounted for movement such that said clamping device is movable from an inoperative clamping device position to a working position, wherein at least a portion of said clamping device is located within an opening of one of the body part components when said clamping device is in said working position, each of said clamping units having one or more clamping segments and an adjusting device, each clamping segment engaging the component clamping contour of the body part components when said clamping device is in said working position such that said one or more clamping segments form a clamping segment contour, said clamping segment contour being substantially identical to the component clamping contour of the body part components, said adjusting device feeding and clamping one of said clamping units to said component clamping contour.

2. A clamping device in accordance with claim 1, wherein the pairs of said clamping units are arranged one after another in the form of one of strips, an open arc, and an arc closed to form a ring.

3. A clamping device in accordance with claim 1, wherein said adjusting device actuates said mobile clamping units together in a controllable sequence.

4. A clamping device in accordance with claim 1, wherein said mobile clamping units are movable between a front clamped position and a rear inoperative position, wherein said clamping units do not overlap with said component clamping contour in the inoperative position, said mobile clamping units being in said inoperative position when said clamping device is in said inoperative clamping device position.

5. A clamping device in accordance with claim 1, wherein said mobile clamping units are movable in a translatory manner m two directions that extend essentially at right angles to one another.

6. A clamping device in accordance with claim 1, wherein said frame is arch-shaped or ring-shaped and has a bottom part and a cover part, which are arranged at spaced locations from one another and are rigidly connected with one another by connection parts, wherein said clamping units and parts of said adjusting device are arranged between said parts.

7. A clamping device in accordance with claim 1, wherein said mobile clamping units that are adjacent to one another overlap at points of impact with an offset in height.

8. A clamping device in accordance with claim 1, wherein said adjusting device has a combined pushing and clamping drive.

9. A clamping device in accordance with claim 1, wherein said adjusting device has one of an integrated motor, an external motor, and a manual drive, said adjusting device including a cylinder, with a power divider for jointly applying pressure to said mobile clamping units.

10. A clamping device in accordance with claim 8, wherein said combined pushing and clamping drive has a plurality of cam shafts arranged each at points of impact of said pairs of clamping units with said feed and clamping cams at different heights.

11. A clamping device in accordance with claim 9, wherein said cam shafts have multi-armed actuating levers for connection with said drive or with said power divider.

12. A clamping device in accordance with claim 10, wherein feed cams are connected with said adjacent mobile clamping units by means of sliding blocks, said feed cams producing a feeding pushing movement.

13. A clamping device in accordance with claim 10, wherein a clamping cam is connected with a clamping wedge arrangement by means of a sliding block to generate a joint clamping movement of said adjacent mobile clamping units.

14. A clamping device in accordance with claim 1, wherein said clamping means comprises one or more feed devices.

15. A clamping device in accordance with claim 14, wherein said clamping device has at least one support for connection with said feed device or for fixing said clamping device in the working position.

16. A clamping device in accordance with claim 15, wherein a plurality of said clamping devices have one or more said supports for mutual connection in a series or for arrangement at an angle.

17. A clamping device in accordance with claim 1, wherein a feed device has a holder with at least one auxiliary axis for accommodating a plurality of said clamping devices and for an internal feeding thereof to said components positioned outside of said feed device.

18. A clamping device in accordance with claim 1, wherein a plurality of said clamping devices are arranged at standardized feed modules.

19. A clamping device in accordance with claim 1, wherein a plurality of said feed modules are connected with one another to form a modular clamping frame.

20. A clamping device in accordance with claim 1, wherein said clamping segments have alternately projecting pins, which engage corresponding flange openings at associated component flanges.

21. A clamping device in accordance with claim 14, wherein said feed device includes a clamping frame or an articulated arm robot, said clamping frame surrounding said body part components.

22. A clamping device in accordance with claim 21, wherein said clamping frame comprises clamping frame feed modules, said clamping frame feed modules defining a modular structure of said clamping frame.

23. A machining station, comprising:
a body part clamping arrangement for clamping body part components with a component clamping contour including a component flange with one or more frame structure clamping devices, one of said clamping body part components defining a body part opening, said one or more frame structure clamping devices comprising a plurality of pairs of fixed strip-shaped clamping units and mobile strip-shaped clamping units, one clamping unit being adjacent to another clamping unit, said one or more frame structure clamping devices being movable from a non-working position to a working position, wherein at least a portion of said one or more frame structure clamping devices is located within said body part opening when said one or more frame structure clamping devices is in said working position, each clamping unit being independently movable, each clamping unit moving simultaneously with another clamping unit from a non-body component support position to a body component support position when said one or more frame structure clamping devices is in said working position, said clamping units forming a row arrangement of clamping units when said clamping units are in said body component supporting position, each of said clamping units having one or more clamping segments and an adjusting device which feeds and clamps said clamping units to said component clamping contour, each clamping segment clamping said component flange when said clamping units are in said body component support position, said one or more clamping segments forming a clamping segment contour when said clamping units are in said body component support position, said clamping segment contour being substantially identical to said component clamping contour, wherein said machining station comprises a framing or welding station for framing or welding said body part components.

* * * * *